United States Patent

Karasa et al.

[11] Patent Number: 6,124,652
[45] Date of Patent: *Sep. 26, 2000

[54] REVERSING MECHANISM FOR ELECTRIC MOTORS

[75] Inventors: Alvydas P. Karasa, Fallston; Thomas J. Howard, Jr., Whitehall, both of Md.

[73] Assignee: Black & Decker Inc., Newark, Del.

[*] Notice: This patent is subject to a terminal disclaimer.

[21] Appl. No.: 09/315,913

[22] Filed: May 20, 1999

Related U.S. Application Data

[63] Continuation of application No. 08/994,172, Dec. 19, 1997, Pat. No. 5,955,802.

[51] Int. Cl.⁷ .................................................. H02K 13/00
[52] U.S. Cl. .......................................... 310/50; 310/239
[58] Field of Search ........................ 310/46, 47, 50, 310/67 R, 238, 239

[56] References Cited

U.S. PATENT DOCUMENTS

| | | | |
|---|---|---|---|
| 1,201,363 | 10/1916 | Shelton | 352/150 |
| 1,633,891 | 6/1927 | Fynn | 318/729 |
| 2,500,571 | 3/1950 | Reynolds | 310/230 |
| 2,764,705 | 9/1956 | Albertson et al. | 310/68 A |
| 3,440,465 | 4/1969 | Pratt et al. | 310/230 |
| 3,681,550 | 8/1972 | Perry et al. | 200/564 |
| 4,056,749 | 11/1977 | Carlson, Jr. et al. | 310/239 |
| 4,311,936 | 1/1982 | Ozaki et al. | 310/242 |
| 4,523,116 | 6/1985 | Dibbern, Jr. et al. | 310/71 |
| 4,539,500 | 9/1985 | Houben et al. | 310/230 |
| 4,581,499 | 4/1986 | Cousins | 200/1 V |
| 4,678,871 | 7/1987 | Wong | 400/248 |
| 4,748,353 | 5/1988 | Klingenstein et al. | 310/50 |
| 4,968,922 | 11/1990 | Bittel | 318/280 |
| 4,978,877 | 12/1990 | Quirijnen | 310/239 |
| 5,196,747 | 3/1993 | Kress et al. | 310/89 |
| 5,225,727 | 7/1993 | Melrose et al. | 310/50 |
| 5,280,210 | 1/1994 | Kress et al. | 310/158 |
| 5,397,952 | 3/1995 | Decker et al. | 310/242 |
| 5,610,467 | 3/1997 | Shiah et al. | 310/239 |

*Primary Examiner*—Elvin Enad
*Assistant Examiner*—Judson H. Jones
*Attorney, Agent, or Firm*—Harness, Dickey & Pierce P.L.C.

[57] ABSTRACT

A power tool has a mechanism to reverse a motor. The mechanism includes a first member secured with the motor surrounding the motor commutator. A pair of electrical contacts are supported in the first member. A second member is rotatable on the fist member. The second member carries a pair of brush holders which include electrical contacts. As the second member is rotated in the first member, the electrical contacts of the brush holders, as well as the electrical contacts in the first member, electrically couple with one another from a first position to a second position which relates to a forward and reverse direction of the motor. A lever moves the second member between its first and second positions.

32 Claims, 5 Drawing Sheets

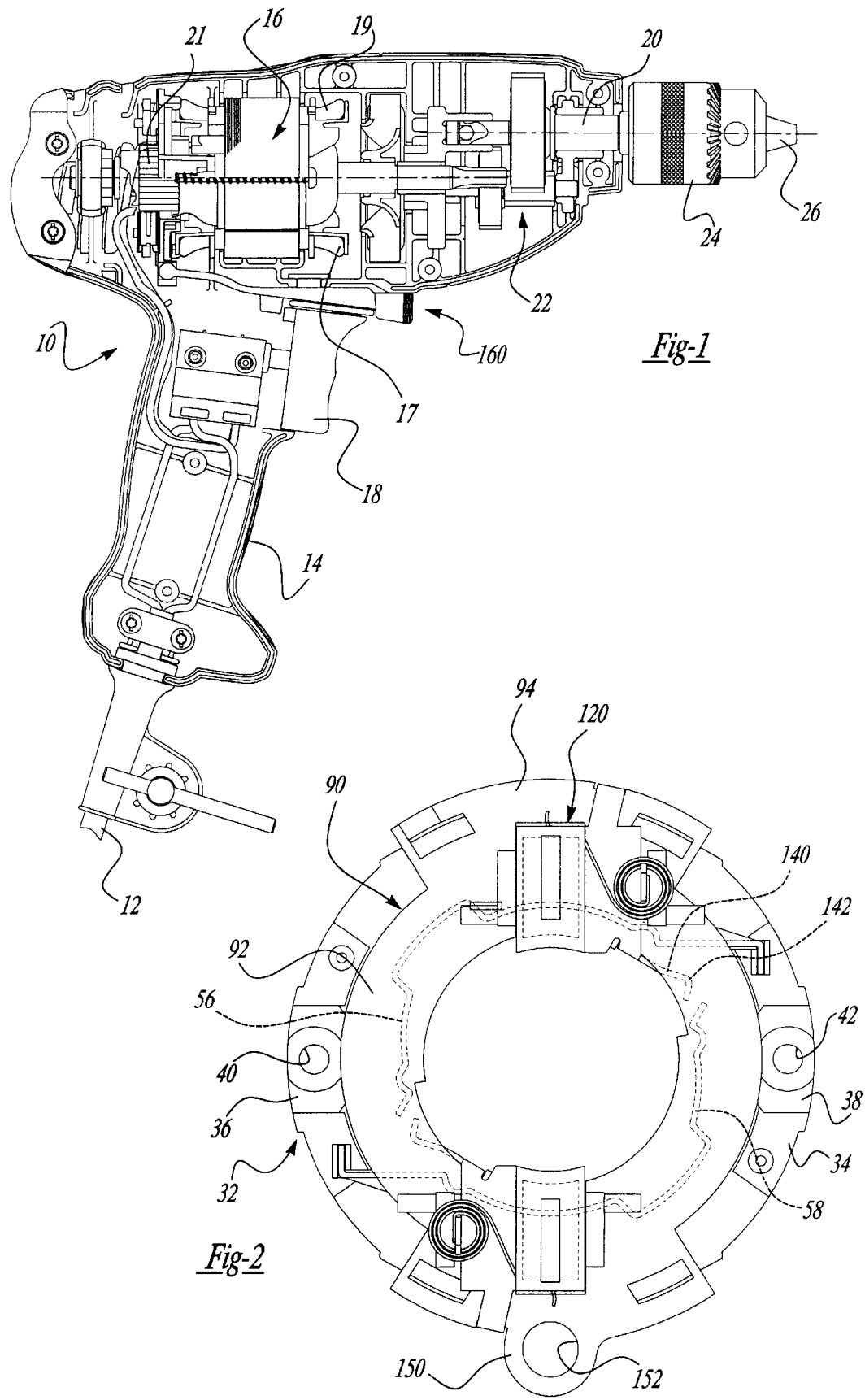

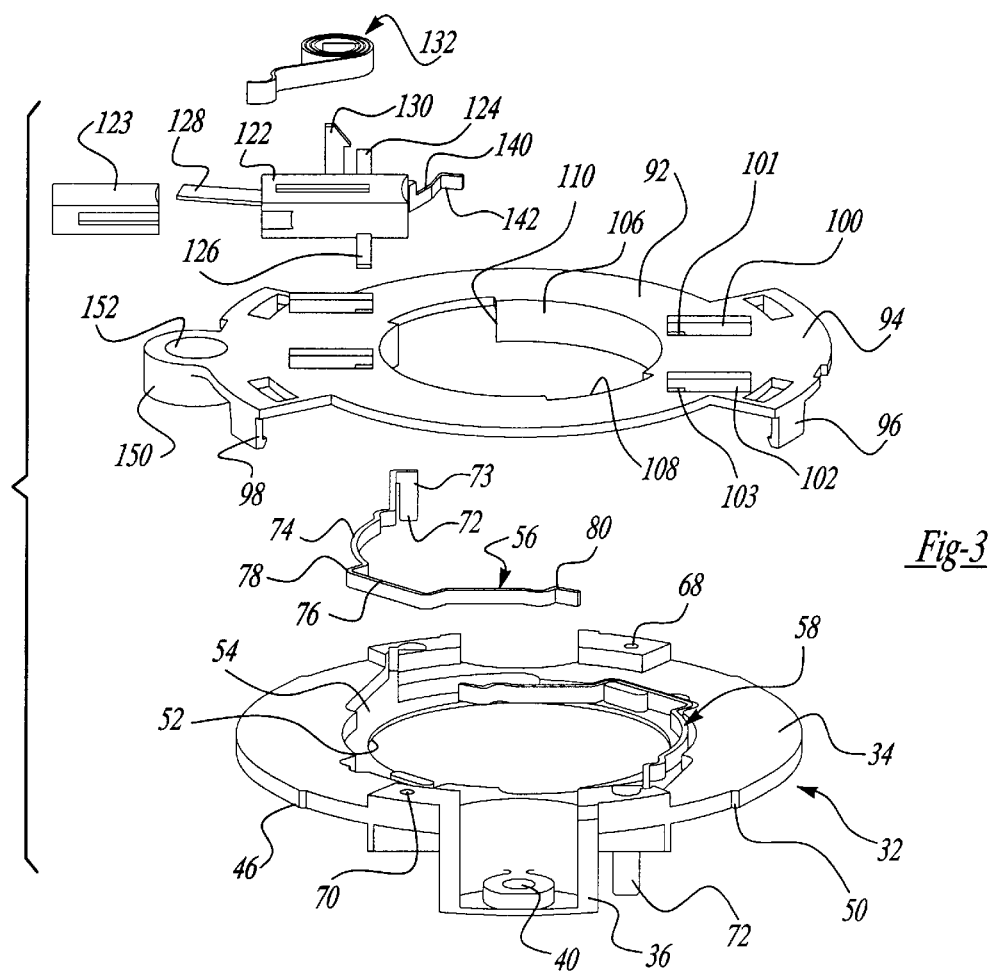
_Fig-3_
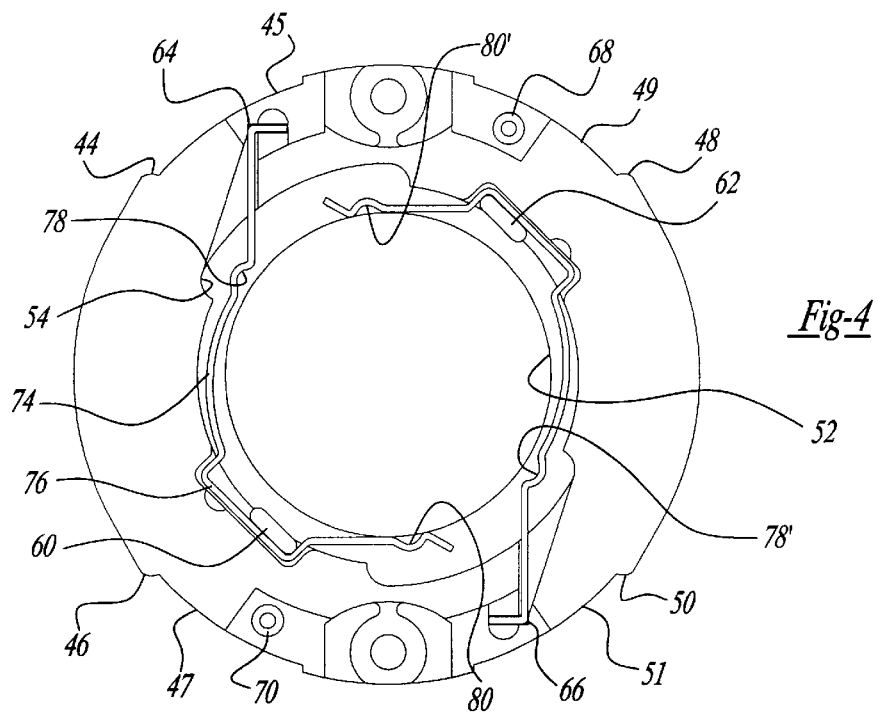
_Fig-4_

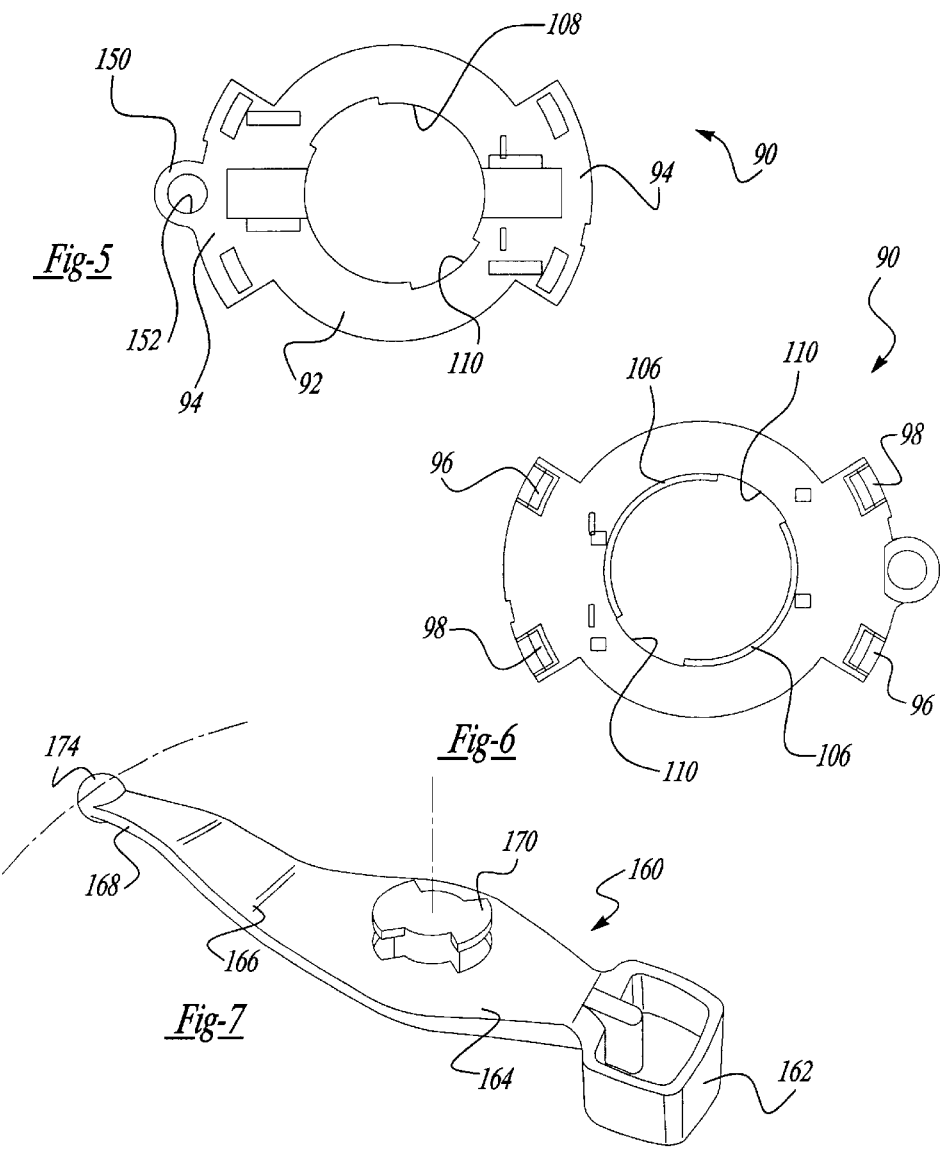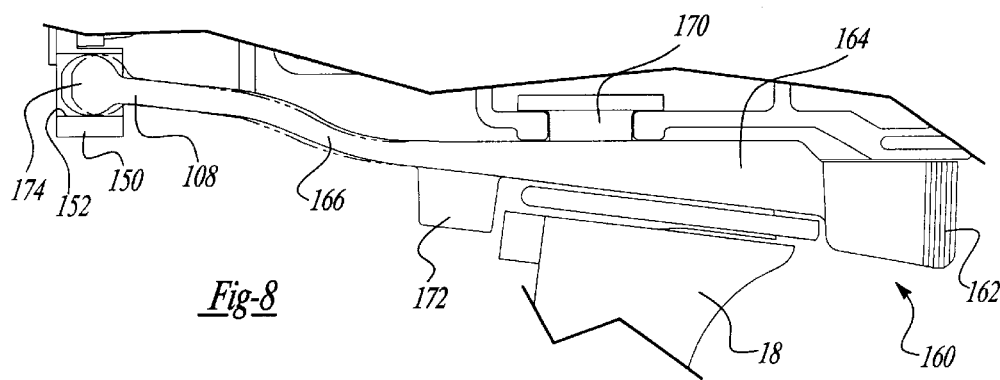

NEUTRAL

REVERSE

FORWARD

REVERSING MECHANISM FOR ELECTRIC MOTORS

CROSS-REFERENCE TO RELATED APPLICATION

This application is a continuation of U.S. application Ser. No. 08/994,172 filed Dec. 19, 1997, now U.S. Pat. No. 5,955,802 issued Sep. 21, 1999, entitled REVERSING MECHANISM FOR ELECTRIC MOTORS, the specification and drawings are herein expressly incorporated by reference.

BACKGROUND OF THE INVENTION

The present invention relates to electrical motors and, more particularly, to a reversing mechanism for motors particularly motors used in portable electric tools.

In portable electric tools such as portable drills, screwdriver/drills and screwdrivers, it is desirable to reverse the direction of rotation of the motor to facilitate, for example, the loosening and removal of screws, the removal of the drill bit from a hole, or the removal of a thread cutting tool out of a bore after cutting a thread in the bore by reverse rotation of the cutting tool.

One conventional method for reversing universal motors is to reverse electrical connection of the brushes and stator windings. To obtain optimum performance and maximum brush life in a reversing motor, there must be a compensation mechanism for the distribution in the magnetic field called neutral plane shift that results from the interaction of the rotor and stator fluxes. One such mechanism is shifting of the brush location about the armature axis in the direction that is opposite to the direction of rotation of the armature. Such shifting avoids sparking and excessive brush and commutator wear. In addition, the sparking will cause electrical noise to be transmitted into the power source supplying electrical energy for the tools. One such brush shifting and reversing switch assembly is disclosed in U.S. Pat. No. 5,089,729 which is assigned to the assignee of the present invention. Here, the assembly includes a reversing switch and an actuator which is movable between forward and reverse positions to reverse the connections of the reversing switch to reverse the direction of the motor rotation. The actuator has a sleeve connected to the reversing switch and surrounds the motor stator to guide movement of the actuator between the forward and reverse positions. A manual tab is located in the motor housing slightly forward to a manual power switch in the tool handle. While this assembly works satisfactory for its intended purpose, designers strive to improve the art.

SUMMARY OF THE INVENTION

A primary object of the present invention is to provide a compact reliable brush shifting and/or reversing switch assembly.

The present invention provides an improved actuator and a brush shifting and/or reversing switch assembly for a power tool with a reversing motor.

In accordance with one aspect of the invention, a reversing mechanism comprises a first member adapted to be secured with the motor winding. The first member has an opening which is adapted to surround the motor commutator. A pair of electrical contacts are supported on the first member and are adapted to be coupled with the motor windings. A second member is coupled with and supported on the first member. The second member has an opening to receive the commutator and is aligned with the opening of the first member. A pair of brush holders are mounted on the second member with electrical contacts extending from the brush holder which electrically couple with the pair of electrical contacts on the first member. The second member is rotatable on the first member. The second member, in a first position, has each electrical contact of the pair of electrical contacts electrically coupled with one of the brush holder electrical contacts. When the second member is rotated to a second position, each electrical contact is electrically coupled with the other of the brush holder electrical contacts. A lever moves the second member between the first and second positions.

The second member has an extending flange to secure the second member with the first member. The first member has a detent coupled with the flange to hold the second member and the first member in first and second positions. The second member also has a collar to receive a ball on the end of the lever. The lever has a hinge portion which enables the lever to extend and contract as it is rotated between its positions. Also, the second member includes a pair of positioning members to frictionally receive projecting members on the brush holder to position the brush holder on the second member.

In accordance with another aspect of the invention, a power tool comprises a housing with a motor within the housing. A power supply is electrically coupled with the motor. An output is coupled with the motor and a mechanism to reverse the motor is positioned around the commutator. The mechanism to reverse the motor comprises a first member adapted to be secured with the motor winding. The first member has an opening which is adapted to surround the motor commutator. A pair of electrical contacts are supported on the first member and are adapted to couple with the motor windings. A second member is coupled with and supported on the first member. The second member has an opening to receive the commutator and is aligned with the opening of the first member. A pair of brush holders are mounted on the second member with electrical contacts extending from the brush holder. The electrical contacts electrically couple with the pair of electrical contacts on the first member. The second member is rotatable on the first member. The second member, in a first position, has each electrical contact of the pair of electrical contacts electrically coupled with one of the brush holder electrical contacts. When the second member is rotated to a second position, each electrical contact is electrically coupled with the other of the brush holder electrical contacts. A lever moves the second member between the first and second positions.

In accordance with an additional aspect of the invention, a power tool comprises a housing with a motor within the housing. A power supply is electrically coupled with the motor. An output is coupled with the motor. Also, a reversing mechanism is coupled with the motor and positioned about the commutator. The reversing mechanism also has an activating coupling. A lever is mounted on the housing to activate the reversing mechanism. The lever is coupled with the activating coupling. The lever has a pivot such that the lever pivots in the housing between a first, second and third position which, in turn. relates to a forward, neutral and reverse movement of the motor.

The lever has a hinge portion which enables the lever to extend and contract as it pivots between the first, second and third positions to maintain connection with the activating coupling. The lever is one piece having a switch portion continuous with a pivot portion which has a member which couples the lever with the housing, to pivot the lever. A hinge portion is continuous with the pivot portion and a coupling portion, continuous with the hinge portion, is at the free end of the lever. Also, the hinge portion has a thickness which is less than the other portions of the lever.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate an embodiment of the invention and together with the description serve to explain the principles of the invention. In the drawings, the same reference numerals indicate the same parts.

FIG. 1 is a partial cross-section view of a reversing mechanism in accordance with the present invention within a hand drill.

FIG. 2 is a perspective view of the brush reversing mechanism in accordance with the present invention.

FIG. 3 is an exploded perspective view of the reversing mechanism of FIG. 2.

FIG. 4 is a top plan view of the first member of the reversing mechanism.

FIG. 5 is a top plan view of the second member of the reversing mechanism.

FIG. 6 is a rear plan view of the second member of the reversing mechanism.

FIG. 7 is a perspective view of the lever in accordance with the present invention.

FIG. 8 is a side elevation view of the lever of FIG. 7 in an extended and contracted position illustrated in phantom.

DETAILED DESCRIPTION OF THE PREFERRED EMBODIMENT

Figure 9A:
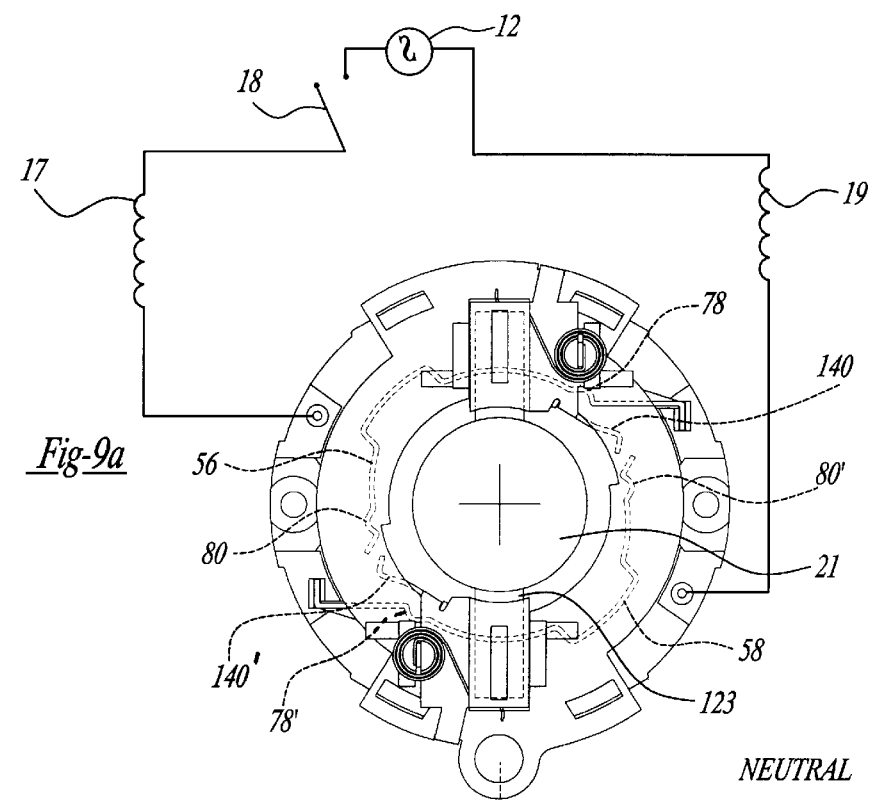
FIGS. 9a–9c are schematic diagrams of the electrical circuit of the motor.
Figure 9B:
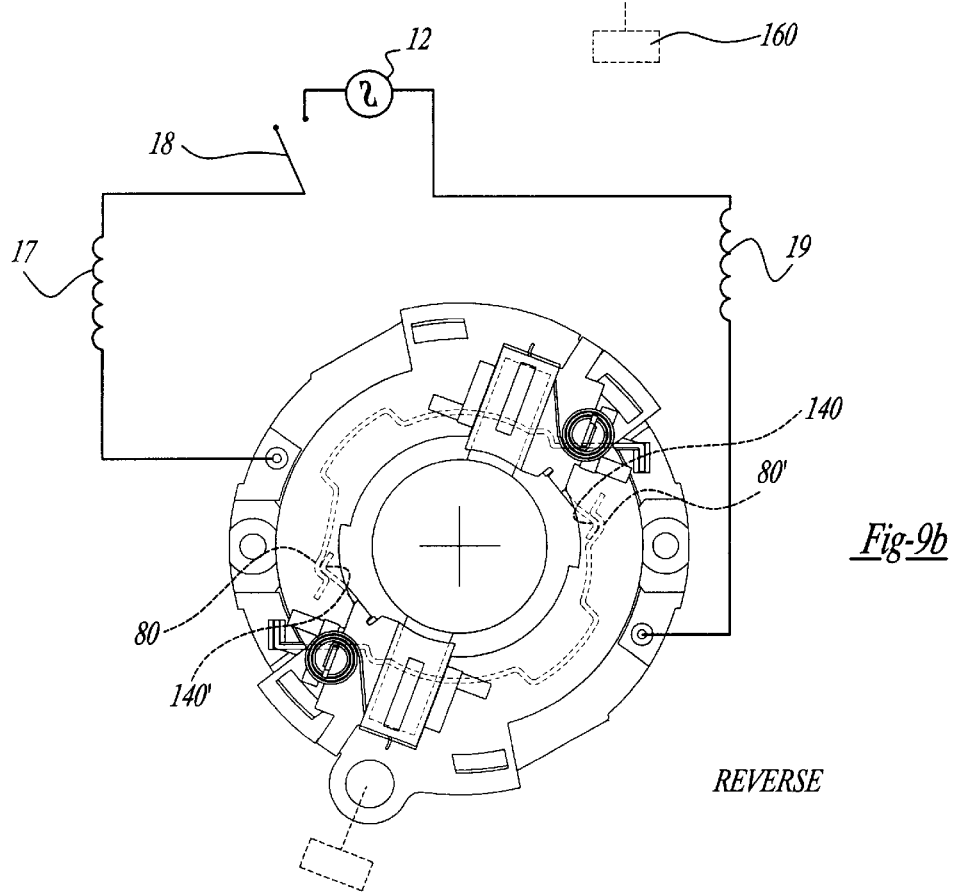
Figure 9C:
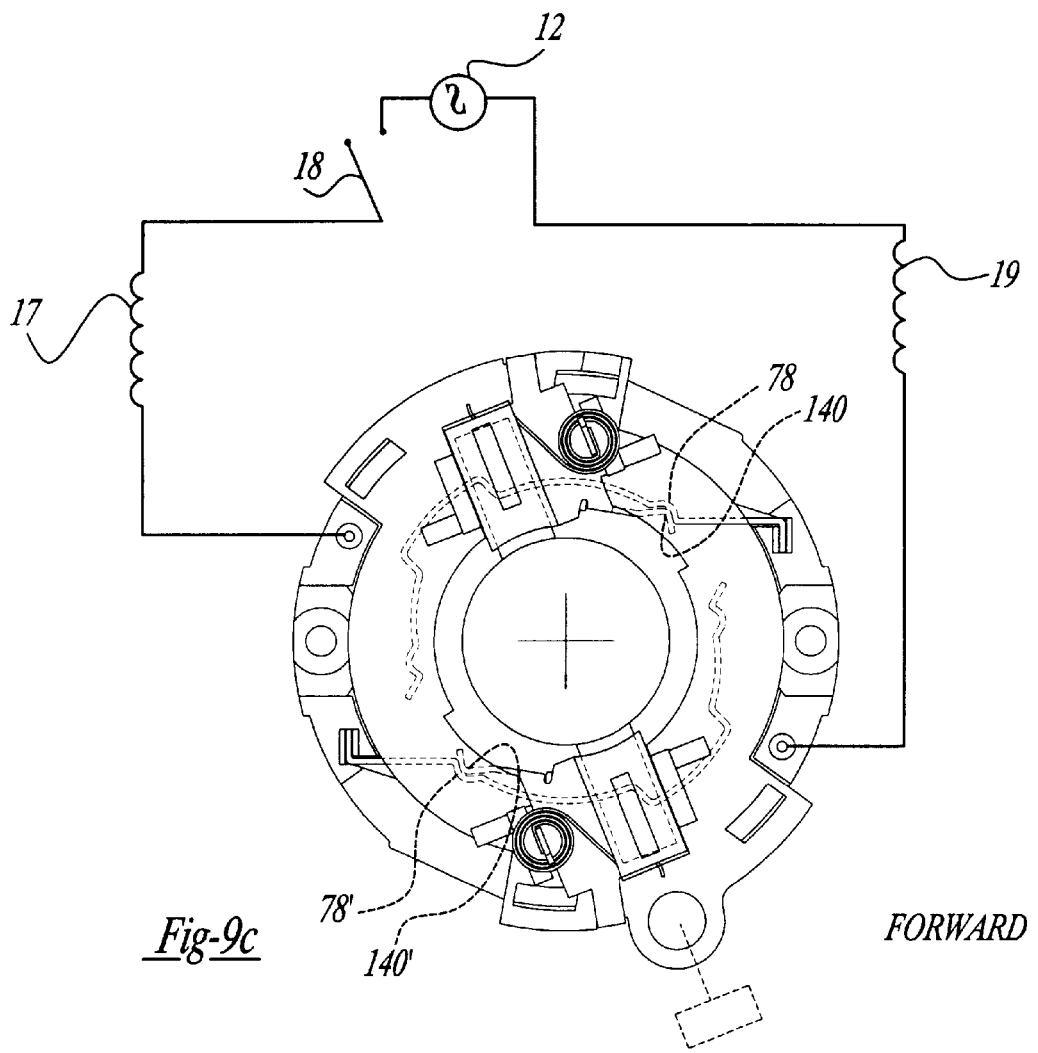

Turning to the figures, a power tool, a drill being illustrated, is designated with the reference numeral 10. The drill includes a power cord 12 for supplying power to the drill motor. However, the drill 10 could be a battery operated device. The drill includes a clam shell housing 14 to house a motor 16. The motor 16, which includes windings 17 and 19, is electrically coupled with the power supply via a trigger switch 18 which activates the motor 16. The motor 16 is coupled with a spindle output 20 via a drivetrain 22. The output spindle 20 also includes a chuck 24 with chuck jaws 26.

The motor 16 includes a mechanism 30 which reverses the commutator brushes so that the motor runs in a forward and reverse direction. The reversing mechanism includes a lever 160 which activates the reversing mechanism 30. The lever 160 is pivotally secured within the housing 14 as will be described herein.

Turning to FIGS. 2–6, the reversing mechanism 30 is illustrated. The reversing mechanism 30 includes a first member 32 which has a first ring member 34 and extending legs 36 and 38. The legs 36 and 38 include apertures 40 and 42 which enable a fastener to secure the first member 32 to the motor 16. The ring member 34 has a plurality of projecting detents 44, 46, 48 and 50, which enable the second member to cam over the detent 44, 46, 48 and 50 and lock in position on the ring 34. The ring member 34 includes a central opening 52 which surrounds the motor commutator 21. A recess 54 surrounds the opening 52. The recess enables positioning of electrical contacts 56 and 58 in the recess 54. Projecting posts 60 and 62 extend from the ring 34 within the recess 54 to position the contacts 56 and 58 within the recess 54. Also, the ring 34 has slots 64 and 66 which enable the end of the electrical connectors 56, 58 to pass through the ring 34 so that the contacts electrically couple with the motor windings 17, 19. Apertures 68 and 70 are formed in the ring 34 and provide a lead-in bore so that wire leads may pass through the openings 68 and 70 and secure with the motor windings 17, 19.

The electrical contacts 56 and 58 are identical and have a post portion 72 which extends through the slots 64 and 66 to couple with the motor winding 17, 19. The post portion 72 includes barbs 73 to secure it in the ring 34. A cantilevered contact portion 74 has an overall arcuate shape with a pair of contact portions 78, 78', 80, 80'. A straight portion 76 of the cantilevered portion 74 fits behind the post 60 or 62 to position the electrical contacts 56, 58 in the recess 54. The contact portions 78, 78' and 80, 80' enable the brush contacts to electrically couple with the electrical contacts 56 and 58.

The second member 90 includes a ring portion 92. The ring portion 92 has a pair of brush box portions 94. The brush box portions 94 each include a pair of projecting members 96 and 98 which secure the second member 90 with the first member 32. Also, the projecting members 96 and 98 ride along the outside of the ring 34 and cam outwardly at the detents 44, 46, 48 and 50 to lock within the outer recesses 45, 47, 49, 51 of the first member ring 34. This locks the second member in a first or second position which relate to forward or reverse movement of the motor. Also, the brush box portions 94 include projecting stops 100 and 102. The stops 100, 102 have cut-outs 101, 103 which enable members of the brush box assemblies 120 to project underneath the stops 100, 102 to position the brush box on the second member 90. The second member 90 includes a flange 106 which surrounds a portion of the opening 108. The opening 108 surrounds the commutator 21. The flange fits inside of the opening 52 of the first member 32. The flange 106 has openings 110 which enable the brush box 120 to be assembled onto ring 92 as well as generating a contact from the brush box 120 to electrically couple with the electrical contacts 56 and 58.

The brush box assemblies 120 each have a brush holding portion 122, holding brush 123, as well as a pair of projecting members 124 and 126. The projecting members 124 and 126 are positioned in cutouts 101, 103 in the stops 100 and 102 to position the brush box assembly 120 onto the second member 90. The brush box assemblies 120 also includes an extending tab 128 which is crimped around a portion of the brush box portion 94 of the second member to secure the brush box assembly 120 onto the brush box portion 94 of the second member 90. Also, a unitary projecting post 130 retains a spring 132 onto the brush box assembly 120. The projecting post 130 includes a head 134 with a projecting tab 135 which extends over the spring 132 prohibiting the spring from rising on the post 130 and prohibits the spring 132 from being accidentally removed from the post 130. Also, the brush box assembly 120 includes an extending electrical contact 140, 140'. The electrical contact 140 includes an angled portion 142 which couples with the electrical portion 78, 78' and 80, 80' of the electrical contact members 56 and 58. The electrical contacts 140 are positioned in the opening 110 on the flange 108.

The second member 90 is rotatable on the first member 32. A collar 150 extends from one of the brush box portions 94 of the member 90. The collar 150 has a bore 152 enabling a portion of the lever 160 to be secured within the collar coupling 150. Thus, when the lever 160 is moved, the second member 90 moves with respect to the fixed first member 32.

Accordingly, as the second member 90 is moved with respect to the first member 32, the motor rotation is reversed. This is best illustrated in the schematic drawings 9a–9c, where in a first position, the brush electrical contacts 140 and 140' are in contact with the electrical contacts 80, 80' of respective electrical contacts 56 and 58. As the second member 90 is rotated in the first member 32, the brush contacts 140 and 140' move into the electrical contact portion 78, 78' of the electrical contacts 56 and 58. Accordingly, the motor is rotated in a first and then a second direction as the electrical contacts move into contact with the different portions of the electrical contacts 56 and 58. Also, the schematic drawings illustrate a neutral position which is between the first and second positions.

Turning to FIGS. 7 and 8, the lever 160 is illustrated. The lever 160 includes a switch portion 162, a pivot portion 164, a hinge portion 166, and a coupling portion 168. The switch portion 162 is positioned outside of the housing 14 so that it can be manually contacted by the user. The pivot portion 164 includes a projecting member 170 which is coupled with the housing to enable pivoting of the lever 160 about the pivot 170. Also, a stop 172 extends from the other side which, in a neutral position, the stop prohibits the trigger 18 from being activated.

The hinge portion 166 is continuous with the pivot portion 164. The hinge portion 166 has a thickness which is less than the remainder of the lever 160. Thus, the hinge portion 166 acts as a live hinge, enabling the lever 160 to extend and contract as the lever is pivoted about pivot 170 to rotate the second member 90 as seen in FIG. 8. A coupling portion 168 includes a ball 174 at its free end which is coupled within the bore 152 of the collar 150. The ball 174 rides in the bore 152 as the lever 160 simultaneously moves radially and laterally. Accordingly, as the lever 160 is switched between positions, the ball rides in the collar 150 rotating the second member 90 on the first member 32.

While the above detailed description describes the preferred embodiment of the present invention, the invention is susceptible to modification, variation, and alteration without deviating from the scope and fair meaning of the subjoined claims.

What is claimed is:

1. A reversing mechanism for a motor, comprising:
   a first member to be secured with a motor winding, said first member adjacent a commutator, and a pair of electrical contacts on said first member, said electrical contacts to be coupled with the motor winding;
   a second member, said second member coupled with said first member, said second member adjacent the commutator and aligned with said first member, a pair of brush holders mounted on said second member, electrical contacts extending from said brush holders for electrically coupling with said pair of electrical contacts, and said second member movable on said first member such that when said second member is in a first position each electrical contact of said pair of electrical contacts is electrically coupled with one of said brush holder electrical contacts and movable to a second position wherein each electrical contact is electrically coupled with the other of said brush holder electrical contacts.

2. The reversing mechanism according to claim 1, wherein said second member including at least one projecting member for securing said second member with said first member.

3. The reversing mechanism according to claim 2, wherein said first member having at least one detent coupling with said at least one projecting member for holding said second member in said first and second positions.

4. The reversing mechanism according to claim 1, wherein a mechanism for moving said second member between said first and second position has a collar for receiving said moving mechanism.

5. The reversing mechanism according to claim 4, wherein said moving mechanism has a ball riding in said collar.

6. The reversing mechanism according to claim 5, wherein said moving mechanism further comprises a hinge portion enabling said moving mechanism to extend and contract as it is rotated between positions.

7. The reversing mechanism according to claim 1, wherein said first member includes a recess and a pair of retention members for receiving a portion of said pair of electrical contacts.

8. The reversing mechanism according to claim 1, wherein said pair of electrical contacts has a first portion positioned through said first member and a cantilevered portion for positioning adjacent said opening.

9. The reversing mechanism according to claim 1, wherein said first member has an alignment aperture for enabling a wire lead to be positioned through said opening into the motor.

10. The reversing mechanism according to claim 1, wherein said second member has a pair of positioning members for receiving a portion of said brush holder for positioning said brush holder on said second member.

11. The reversing mechanism according to claim 10, wherein said brush holder has a pair of projecting members frictionally engaging said pair of positioning members.

12. The reversing mechanism according to claim 11, wherein said brush holder has a tab for securing said brush holder with said second member.

13. A power tool comprising:
   a housing, a motor within said housing, a power supply electrically coupled with said motor, an output coupled with said motor, and a mechanism for reversing said motor comprising:
   a first member associated with a motor winding, said first member adjacent a commutator, and a pair of electrical contacts on said first member, said electrical contacts to be coupled with the motor winding;
   a second member, said second member coupled with said first member, said second member receiving the commutator and aligned with said first member, a pair of brush holders mounted on said second member, electrical contacts extending from said brush holders for electrically coupling with said pair of electrical contacts, and said second member movable on said first member such that said second member is in a first position each electrical contact of said pair of electrical contacts is electrically coupled with one of said brush holder electrical contacts and rotatable to a second position wherein each electrical contact is electrically coupled with the other of said brush holder electrical contacts.

14. The power tool according to claim 13, wherein said second member including at least one projecting member for securing said second member with said first member.

15. The power tool according to claim 14, wherein said first member having at least one detent coupling with said at least one projecting member for holding said second member in said first and second positions.

16. The power tool according to claim 13, wherein a mechanism for moving said second member between said first and second position has a collar for receiving said moving mechanism.

17. The power tool according to claim 16, wherein said moving mechanism has a ball riding in said collar.

18. The power tool according to claim 17, wherein said moving mechanism further comprises a hinge portion enabling said moving mechanism to extend and contract as it is rotated between positions.

19. The power tool according to claim 13, wherein said first member includes a recess and a pair of retention members for receiving a portion of said pair of electrical contacts.

20. The power tool according to claim 13, wherein said pair of electrical contacts has a first portion positioned through said first member and a cantilevered portion for positioning adjacent said opening.

21. The power tool according to claim 13, wherein said first member has an alignment aperture for enabling a wire lead to be positioned through said opening into the motor.

22. The power tool according to claim 13, wherein said second member has a pair of positioning members for receiving a portion of said brush holder for positioning said brush holder on said second member.

23. The power tool according to claim 22, wherein said brush holder has a pair of projecting members frictionally engaging said pair of positioning members.

24. The power tool according to claim 23, wherein said brush holder has a tab for securing said brush holder with said second member.

25. A power tool comprising:
   a housing, a motor within said housing, a power supply electrically coupled with said motor, an output coupled with said motor, and a mechanism for reversing said motor, said mechanism adjacent a commutator of said motor and having an activating coupling, and a member mounted on said housing for activating said reversing mechanism, said member coupled with said activating coupling, a pivot on said member enabling pivoting of said member between first, second and third positions for forward, neutral and reverse movement of said motor.

26. The power tool according to claim 25, wherein said member has a projecting member associated with an activation member of said power tool, such that when said member is in a neutral position said activation member is prohibited from activation.

27. The power tool according to claim 25, wherein said member has a portion enabling said member to extend and contract as it pivots between said first, second and third position to maintain connection with said activating coupling.

28. The power tool according to claim 27, wherein said portion acts as a live hinge.

29. The power tool according to claim 28, wherein said member is a unitary member.

30. The power tool according to claim 29, wherein said member has a thickness in said portion less than the remainder of said member.

31. The power tool according to claim 25, wherein said member has a ball end coupling with said activating member.

32. The power tool according to claim 25, wherein said member is one piece having a switch portion continuous with a pivot portion, which has a member coupling with said housing for pivoting of said member, a hinge portion continuous with said pivot portion and a coupling portion continuous with said hinge portion.

* * * * *